(12) United States Patent
Sekiguchi

(10) Patent No.: US 8,763,650 B2
(45) Date of Patent: Jul. 1, 2014

(54) METHOD AND DEVICE FOR RECOVERING PUNCTURE REPAIR LIQUID

(75) Inventor: Takumi Sekiguchi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 170 days.

(21) Appl. No.: 13/521,134

(22) PCT Filed: Nov. 19, 2010

(86) PCT No.: PCT/JP2010/070670
§ 371 (c)(1),
(2), (4) Date: Jul. 9, 2012

(87) PCT Pub. No.: WO2011/086762
PCT Pub. Date: Jul. 21, 2011

(65) Prior Publication Data
US 2012/0312387 A1 Dec. 13, 2012

(30) Foreign Application Priority Data
Jan. 15, 2010 (JP) .................................. 2010-006686

(51) Int. Cl.
| B65B 31/00 | (2006.01) |
| B29C 73/02 | (2006.01) |
| B29C 73/22 | (2006.01) |
| B29C 73/16 | (2006.01) |
| B29L 30/00 | (2006.01) |

(52) U.S. Cl.
CPC ................ B29C 73/02 (2013.01); B29C 73/22 (2013.01); *B29L 2030/00* (2013.01); B29C 73/166 (2013.01)
USPC .................................... 141/8; 141/38; 141/66

(58) Field of Classification Search
CPC .............................. B29C 73/166; B60C 5/004
USPC ............................................ 141/8, 38, 65, 66
See application file for complete search history.

(56) References Cited

U.S. PATENT DOCUMENTS 4,700,531 A * 10/1987 Hsu et al. ......................... 53/412
5,927,348 A * 7/1999 Gerresheim et al. ............ 141/65

(Continued)

FOREIGN PATENT DOCUMENTS

| JP | 01-266047 A | 10/1989 |
| JP | 10-67212 A | 3/1998 |

(Continued)

OTHER PUBLICATIONS

International Search Report of corresponding International Application No. PCT/JP2010/070670, dated on Feb. 1, 2011.

*Primary Examiner* — Jason K Niesz
(74) *Attorney, Agent, or Firm* — Global IP Counselors, LLP

(57) ABSTRACT

A device for recovering puncture repair liquid includes a tube to be inserted from a tire valve mounted to a wheel up to an inner surface of a tire, a container having a pair of connecting ports for receiving and containing puncture repair liquid recovered from inside the tire, and a connecting hose for connecting between the tire valve and one of the connecting ports. The other connecting port is removably attachable to a pressurized air source. A valve core is detached from a tire valve of a wheel with a tire mounted thereon into which puncture repair liquid has been injected. The tube is inserted into the tire which is filled with air from the pressurized air source that is then detached from the container. Thus, recovery of the puncture repair liquid is efficiently performed using pressure escaping from the tire without cutting out the tire valve.

15 Claims, 5 Drawing Sheets

(56) References Cited

U.S. PATENT DOCUMENTS

| | | | |
|---|---|---|---|
| 6,332,711 B1 * | 12/2001 | Inuzuka et al. | 383/9 |
| 7,658,543 B2 * | 2/2010 | Shiokawa et al. | 383/107 |
| 2005/0284536 A1 | 12/2005 | Kojima et al. | |
| 2008/0089618 A1 * | 4/2008 | Blythe | 383/25 |

FOREIGN PATENT DOCUMENTS

| | | |
|---|---|---|
| JP | 2003-127242 A | 5/2003 |
| JP | 2005-138400 A | 6/2005 |
| JP | 2006-7660 A | 1/2006 |
| JP | 2007-331210 A | 12/2007 |
| JP | 2009-041006 A | 2/2009 |

* cited by examiner

FIG. 2
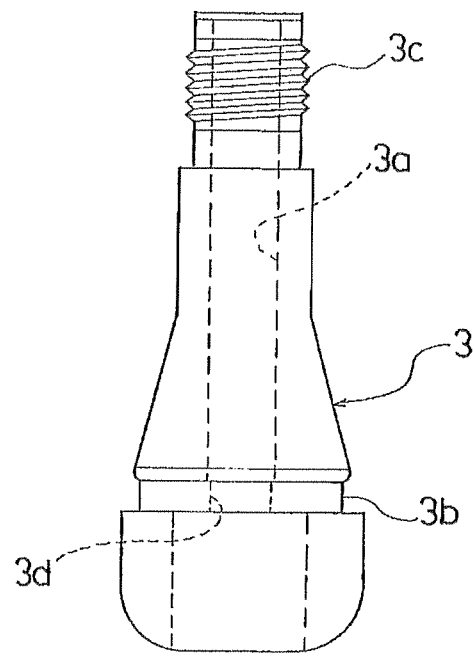
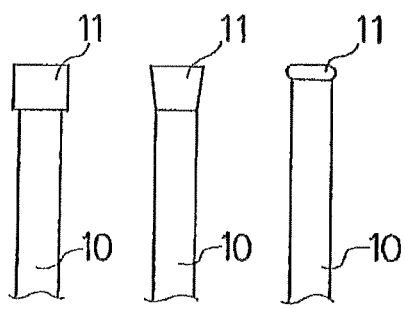
FIG. 3 (a)   FIG. 3 (b)   FIG. 3 (c)

METHOD AND DEVICE FOR RECOVERING PUNCTURE REPAIR LIQUID

CROSS-REFERENCE TO RELATED APPLICATIONS

This U.S. National stage application claims priority under 35 U.S.C. §119(a) to Japanese Patent Application No. 2010-006686, filed in Japan on Jan. 15, 2010, the entire contents of Japanese Patent Application No. 2010-006686 are hereby incorporated herein by reference.

BACKGROUND

1. Field of the Invention

The present invention relates to a method and a device for recovering puncture repair liquid injected into a tire, and more specifically relates to a method and a device for recovering puncture repair liquid which make it possible to efficiently perform a recovery operation without cutting out a tire valve.

2. Background Information

In recent years, when a tire attached to a vehicle goes flat, puncture repair liquid is injected into the tire via a tire valve to thereby repair the puncture on an emergency basis and at the same time to fill the tire with air.

The method for repairing a puncture as described above, however, has the following problem. Specifically, the puncture repair liquid remains in the tire. Thus, when the tire is detached from a wheel to be replaced with a new one, the puncture repair liquid overflowed from the tire is smeared on equipment such as a tire changer.

Various methods for preventing the puncture repair liquid from overflowing are proposed as countermeasures for the problem. For example, a method has been proposed in Japanese patent application Kokai publication No. 2009-41006 in which an emulsion coagulant is injected into a tire to solidify a puncture repair liquid remaining therein, and the solidified puncture repair liquid is disposed of after the tire is detached from a wheel. However, this case exhibits a disadvantage that the emulsion coagulant is difficult to inject into the tire attached to the wheel.

Other methods have been proposed, such as those described in Japanese patent application Kokai publication No. 2003-127242 and Japanese patent application Kokai publication No. Hei 10-67212, in which a tire valve is cut out from a wheel, a tube is inserted into the tire through a tire-valve attaching hole, and puncture repair liquid in the tire is drained through the tube. However, this case exhibits a disadvantage that the tire valve needs to be cut out and thus the tire valve cannot be reused.

Still another method has been proposed in Japanese patent application Kokai publication No. 2007-331210 in which a tube for forming a gas passage and a tube for forming a liquid passage are inserted into a tire valve, pressurized air is introduced into a tire through the gas passage while puncture repair liquid is drained from the tire through the liquid passage. However, this case exhibits a disadvantage that the draining requires a considerable time. This is because the need to insert the tube for forming the gas passage and the tube for forming the liquid passage into the tire valve inevitably leads to the need to make the liquid passage extremely narrow.

SUMMARY

An object of the present invention is to provide a method and a device for recovering puncture repair liquid which make it possible to efficiently perform a recovery operation without cutting out a tire valve.

A method for recovering puncture repair liquid according to the present invention for achieving the object is characterized in that the method includes: using a device for recovering puncture repair liquid comprising a tube, a container, and a connecting hose, the tube having at least such a length that the tube reaches an inner surface of a tire when inserted into the tire from a tire valve mounted to a wheel, the container having a pair of connecting ports and being for receiving and containing puncture repair liquid recovered from the inside of the tire, the connecting hose being configured to be connected between the tire valve and one of the connecting ports of the container, the other connecting port of the container being configured to be attachable to and detachable from a pressurized air source; detaching a valve core from a tire valve of a wheel with a tire mounted thereon into which a puncture repair liquid has been injected; inserting the tube into the tire via the tire valve; connecting the connecting hose and the container between the tire valve and the pressurized air source; filling the tire with air from the pressurized air source; then detaching the pressurized air source from the other connecting port of the container; and recovering the puncture repair liquid in the tire into the container by utilizing an action caused by the pressure escaping from the tire.

A device for recovering puncture repair liquid according to the present invention for achieving the object is characterized in that the device for recovering puncture repair liquid comprises a tube, a container, and a connecting hose, the tube having at least such a length that the tube reaches an inner surface of a tire when inserted into the tire from a tire valve mounted to a wheel, the container having a pair of connecting ports and being for receiving and containing puncture repair liquid recovered from the inside of the tire, the connecting hose being configured to be connected between the tire valve and one of the connecting ports of the container, the other connecting port of the container being configured to be attachable to and detachable from a pressurized air source.

According to the present invention, with the use of the device for recovering puncture repair liquid including the tube, the container, and the connecting hose, the tube is inserted into the tire via the tire valve, the container and the connecting hose are connected between the tire valve and the pressurized air source, the tire is filled with air from the pressurized air source, the pressurized air source is thereafter detached from the other connecting port of the container, and the puncture repair liquid in the tire is recovered into the container by utilizing an action by which a pressure in the tire is lost. In this case, the tire valve does not have to be cut out. After the puncture repair liquid is recovered, the tire valve can be used as it is. In addition, since the tube can be made as wide as possible within an allowable range of the tire valve, the puncture repair liquid can be recovered in a shorter time than in a case where a tube for a gas passage and a tube for a liquid passage are inserted into a tire valve as in a conventional case. Thus, according to the present invention, the recovery operation of the puncture repair liquid can be efficiently performed without cutting out the tire valve.

In the present invention, it is preferable that the tube be made narrower than a narrowest portion of a through-hole of the tire valve and that a locking portion wider than the narrowest portion of the through-hole of the tire valve be provided to an end portion of the tube on the tire valve side. Thereby, the tube can be inserted into the tire from the tire valve easily. In addition, since the locking portion of the tire provided on the end portion of the tube on the tire valve side is locked by the narrowest portion of the through-hole in the tire valve, the tube can be prevented from coming off the tire valve into the tire.

It is preferable that the tube have a scale indicating a cutting length and that the tube be cut, according to a tire size, based on the scale. Specifically, the tube is set at such a dimension of a length as to reach an inner surface of any assumable tire from the tire valve of the tire. The tube is appropriately cut based on the scale, and thereby the tube can be adapted to any of various tire sizes. The scale is preferably indicated on the tube, but a scale printed on paper or the like may be bundled with the tube, depending on the case.

It is preferable that the device for recovering puncture repair liquid of the present invention include an attachment to be attached to the other connecting port of the container and that the attachment include a discharge port smaller than the other connecting port of the container. In addition, it is preferable that after the pressurized air source is detached from the other connecting port of the container as described above, the attachment having the discharge port smaller than the other connecting port of the container be attached to the other connecting port of the container to reduce a gas discharge flow rate by using the attachment. When the tire has a too high pressure therein, the puncture repair liquid might vigorously flow out and blow from the other connecting port of the container. However, attaching the attachment to the other connecting port can prevent the puncture repair liquid from blowing outside. Moreover, it is preferable that the attachment be provided with a pool portion for containing the puncture repair liquid blown from the container.

BRIEF DESCRIPTION OF THE DRAWINGS

FIG. 2 is a side view showing an example of a tire valve used in the present invention;

FIGS. 3(a) through 3(c) show examples of parts of the tubes used in the present invention;

DETAILED DESCRIPTION OF EMBODIMENTS

Figure 1:
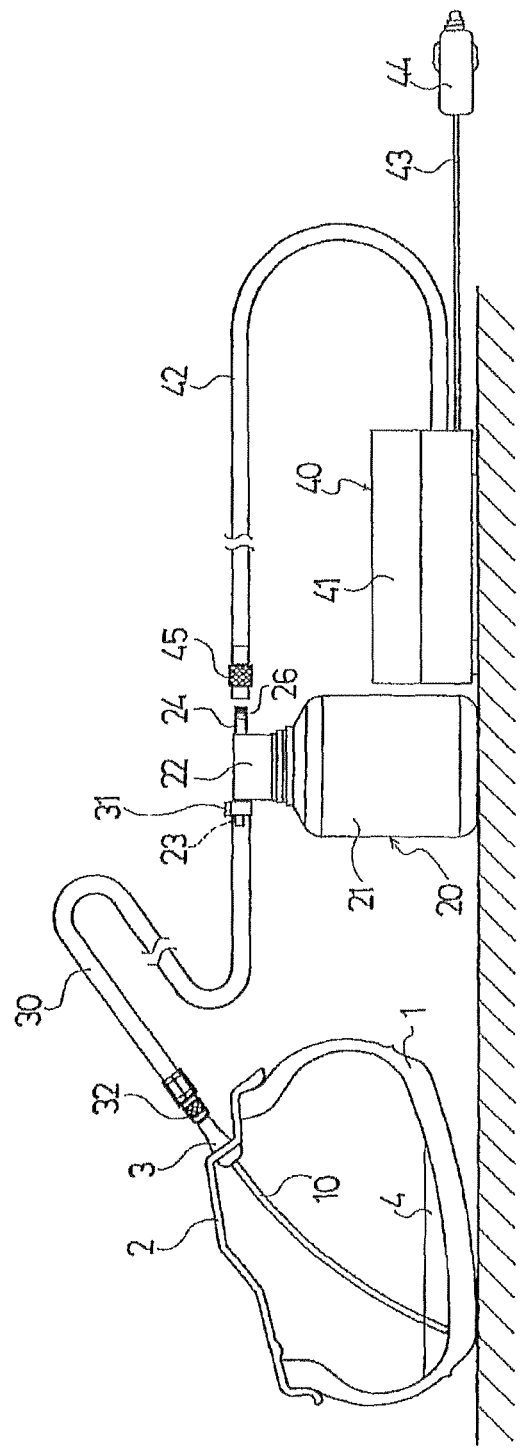
FIG. 1 is a side view showing a device for recovering puncture repair liquid according to an embodiment of the present invention.
Figure 4:
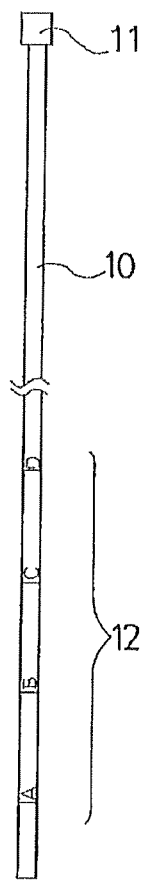
FIGS. 4(a) and 4(b) show examples of parts of tubes used in the present invention.
Figure 4:
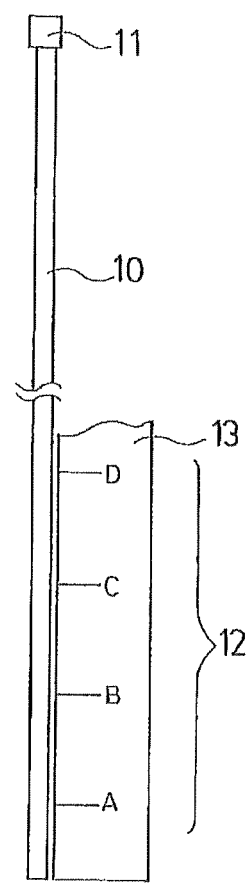

A configuration of the present invention will be described in detail below with reference to the attached drawings. FIGS. 1 to 7(d) show a device for recovering puncture repair liquid according to an embodiment of the present invention. FIG. 1 illustrates a pneumatic tire 1, a wheel 2, a tire valve 3 mounted to the wheel 2, and puncture repair liquid 4 injected into the pneumatic tire 1.

As shown in FIG. 1, the device for recovering puncture repair liquid in this embodiment includes a tube 10, a container 20, and a connecting hose 30. The tube 10 has at least such a length that the tube 10 reaches an inner surface of the tire when inserted into the tire 1 from the tire valve 3 of the wheel 2. The container 20 includes connecting ports 23 and 24 and is intended to contain the puncture repair liquid 4 recovered from the inside of the tire 1. The connecting hose 30 is connected between the tire valve 3 and one connecting port 23 of the container 20. The other connecting port 24 of the container 20 is attachable to and detachable from a pressurized air source 40.

As shown in FIG. 2, the tire valve 3 has a cylindrical through-hole 3a (illustrated in a broken line) therein. A narrowed portion 3b to be engaged with an attachment hole of the wheel 2 is formed on the proximal end side of the tire valve 3, while a male screw portion 3c is formed on the distal end side thereof. The through-hole 3a is narrowed locally in a portion in a longitudinal direction, and thus a narrowest portion 3d having the smallest diameter is formed in the portion. In air filling, a valve core (not illustrated) is inserted into the tire valve 3.

Meanwhile, the tube 10 includes a locking portion 11 in an end portion on the tire valve side as shown in FIGS. 3(a) to 3(c). An outer diameter of the tube 10 is smaller than an inner diameter of the narrowest portion 3d of the through-hole 3a of the tire valve 3, but an outer diameter of the locking portion 11 is larger than the inner diameter of the narrowest portion 3d of the through-hole 3a of the tire valve 3. In FIG. 3(a), a step is formed between the tube 10 and the locking portion 11. In FIG. 3(b), the locking portion 11 is tapered in such a manner as to be gradually widened from the main body side of the tube 10. In FIG. 3(c), the locking portion 11 is formed by thermally deforming an end of the tube 10 on the tire valve side. The locking portion 11 may also be formed into a similar shape of the valve core. It goes without saying that an adaptor for forming the locking portion 11 can be attached to the tube 10.

As described above, the tube 10 is made narrower than the narrowest portion 3d of the through-hole 3a of the tire valve 3, while the locking portion 11 thicker than the narrowest portion 3d of the through-hole 3a of the tire valve 3 is provided on the end portion of the tube 10 on the tire valve side. In this case, the tube 10 can be inserted into the tire 1 easily from the tire valve 3. In addition, since the locking portion 11 of the tube 10 is locked by the narrowest portion 3d of the through-hole 3a of the tire valve 3, the tube 10 can be prevented from coming off the tire valve 3 into the tire 1.

Also, air tightness between the tube 10 and the tire valve 3 can be ensured by making the locking portion 11 of the tube 10 thicker than the narrowest portion 3d. To ensure the air tightness, an inner circumferential surface of the through-hole 3a of the tire valve 3 and an outer circumferential surface of the locking portion 11 of the tube 10 may be brought into close contact with each other to thereby create a seal therebetween. Alternatively, an end face of the narrowest portion 3d of the through-hole 3a of the tire valve 3 in an axial direction of the tire valve 3 and an end face of the locking portion 11 of the tube 10 in an axial direction of the tube 10 may be brought into close contact with each other to thereby create a seal therebetween.

A material of the tube 10 is not particularly limited, and rubber such as silicone rubber, a synthesis resin such as polypropylene, polyethylene, polyurethane, polyamide or fluororesin, metal or the like can be used. However, a too soft material might deteriorate the performance of the insertion operation of the tube 10.

The outer diameter of the tube 10 may be set in a range from 2.5 mm to 3.15 mm. A too large diameter of the tube 10 makes it difficult to insert the tube 10 into the narrowest portion 3d of the through-hole 3a of the tire valve 3, while a too small diameter thereof requires a considerable time in draining of the puncture repair liquid 4. In contrast, the outer diameter of the locking portion 11 of the tube 10 may be set in a range from 3.2 mm to 4.0 mm. A too large diameter of the locking portion 11 makes it difficult to push the locking portion 11 into the tire valve 3, while a too small diameter causes the tube 10 to easily come off the tire valve 3 into the tire 1.

As shown in FIGS. 4(a) and 4(b), the tube 10 includes a scale 12 indicating a cutting length by using alphabets A to D. The tube 10 is designed to be cut, according to a tire size, based on the scale 12. Specifically, the tube 10 yet to be used is set at such a dimension of a length as to reach the inner surface of any assumable tire from the tire valve 3 of the tire. The tube 10 is designed to be adapted to any of various tire sizes by being appropriately cut based on the scale 12. In FIG. 4(a), the scale 12 is directly indicated on the tube 10. In FIG. 4(b), the scale 12 is printed on a sheet 13 made of paper or the like. The sheet 13 on which the scale 12 is printed may be dedicatedly provided, or part of an instruction manual may be utilized. In each of the cases, the instruction manual or the like describes what the scale 12 means. For example, the instruction manual describes a correspondence between the alphabets A to D on the scale 12 and the tire sizes. Lines of the scale 12 may be made distinguishable from each other by changing the thickness, color or number of the lines, or numerals, symbols or the like instead of the aforementioned alphabets may be provided to the scale 12.

Figure 5:
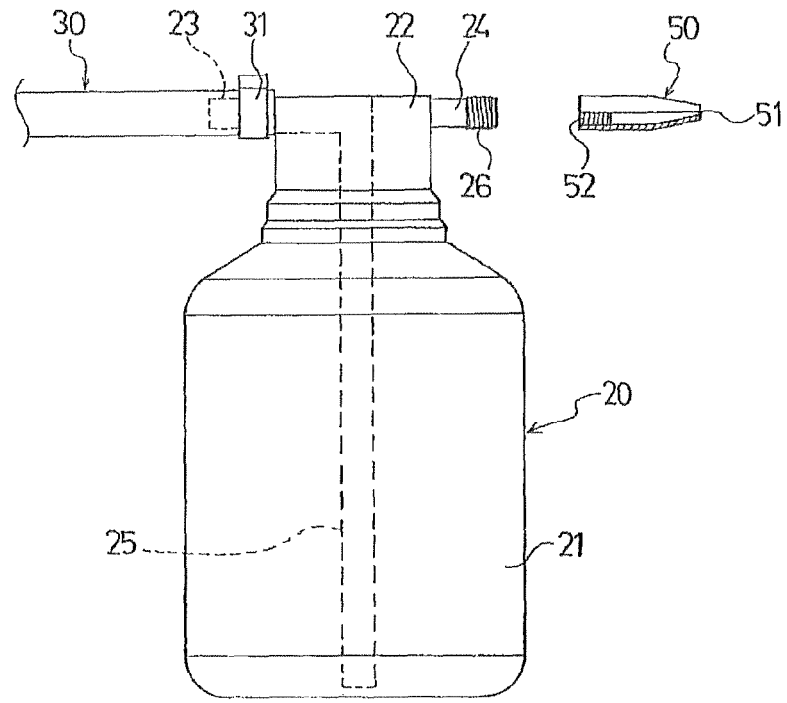
FIG. 5 is a side view showing an example of an attachment used in the present invention with its part cut away.

As shown in FIG. 5, the container 20 includes: a container main body 21 having a capacity of 650 ml at maximum; and a lid 22 attached to the top of the container main body 21. The connecting ports 23 and 24 are formed at opposed positions on a circumference of the lid 22. The one connecting port 23 is connected to an inner pipe 25 extending up to a bottom portion of the container main body 21, while the other connecting port 24 communicates with the inside of the container 20 without any component connected thereto. In addition, a male screw portion 26 is formed on the connecting port 24.

Figure 6:
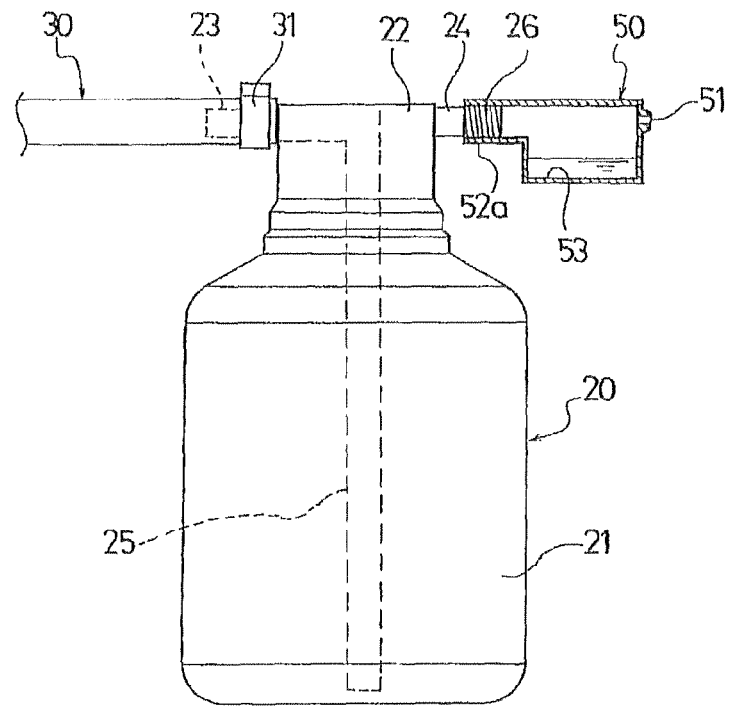
FIG. 6 is a side view showing another example of the attachment used in the present invention with its part cut away.
Figure 7:
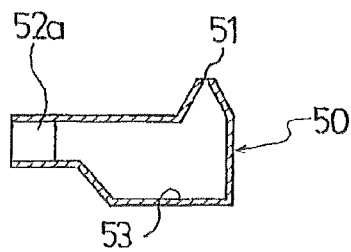
FIGS. 7(a) through 7(d) show modifications of the attachment used in the present invention.
Figure 7:
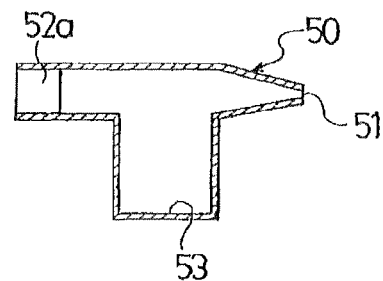
Figure 7:
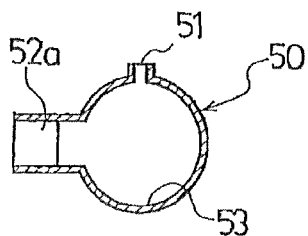
Figure 7:
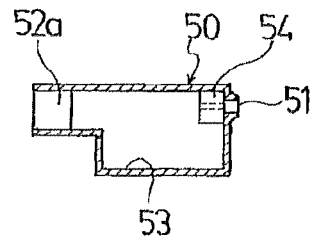

The device for recovering puncture repair liquid includes an attachment 50 to be attached to the other connecting port 24 of the container 20. The attachment 50 includes a discharge port 51 smaller than the other connecting port 24 of the container 20 and a female screw portion 52 to be engaged with the male screw portion 26 of the connecting port 24. The attachment 50 reduces a flow rate of discharging gas from the container 20. As shown in FIG. 6, the attachment 50 may be provided with a pool portion 53 for containing the puncture repair liquid 4 blown from the container 20. Note that in FIG. 6, a fitting portion 52a configured to fit around the male screw portion 26 of the connecting port 24 by elastic deformation is formed instead of the female screw portion 52. For this reason, it is not necessary to rotate the attachment 50 when the attachment 50 is detached.

Further, as shown in FIGS. 7(a) through 7(d), the attachment 50 can be employed in such various structures that make it possible to prevent the puncture repair liquid 4 from blowing outside. In FIG. 7(a), the discharge port 51 faces upward. In FIG. 7(b), the pool portion 53 is deeper, thus having a larger capacity. In FIG. 7(c), the discharge port 51 faces upward, and the pool portion 53 has a spherical shape. In FIG. 7(d), a whistle 54 is provided to the discharge port 51 of the attachment 50. The whistle 54 is designed to whistle triggered by gas discharge from the discharge port 51. Thus, based on the whistle from the whistle 54, a sufficient decrease of the air pressure in the tire 1 can be determined.

As shown in FIG. 1, one end portion of the connecting hose 30 is fixed onto the connecting port 23 of the container 20 by a fastening band 31, and a connecting fitting 32 having a female screw portion is rotatably attached to the other end portion of the connecting hose 30. This configuration makes the connecting hose 30 attachable to and detachable from the tire valve 3 by operating the connecting fitting 32.

The pressurized air source 40 includes an electrical compressor 41, a hose 42 connected to the compressor 41, and a cord 43 and a plug 44 for connecting the compressor 41 to a power source. A connecting fitting 45 having a female screw portion is rotatably attached to an end portion of the hose 42. This configuration makes the hose 42 attachable to and detachable from the connecting port 24 of the container 20 by operating the connecting fitting 45.

Note that since the pressurized air source 40 is not required to supply a high pressure, a bicycle pump or the like can be used instead of the aforementioned electrical compressor 41. In this case, the power supply is not needed. A commercial large-scale compressor can be used instead of the portable compressor 21, as a matter of course.

Next, a description is given of a method for recovering puncture repair liquid by using the aforementioned device for recovering puncture repair liquid. Firstly, as shown in FIG. 1, the valve core is detached from the tire valve 3 in the wheel 2 placed on the tire 1 into which the puncture repair liquid 4 is injected, and the tube 10 is inserted into the tire 1 via the tire valve 3. Since the length of the tube 10 has been adjusted to an appropriate length in advance, one end of the tube 10 contacts the inner surface of the tire, while the locking portion 11 thereof on the tire valve side is locked with the narrowest portion 3d of the through-hole 3a of the tire valve 3.

Next, the connecting hose 30 is connected to the tire valve 3, and the hose 42 of the pressurized air source 40 is connected to the connecting port 24 of the container 20. Thereby, the container 20 and the connecting hose 30 are connected between the tire valve 3 and the pressurized air source 40 to form a series of pressurized air supply paths. In this state, the tire 1 is filled with air from the pressurized air source 40. An amount of injecting the puncture repair liquid 4 is, for example, approximately 650 ml in the case of the size of 215/60R16, and thus the air pressure inside the tire 1 may be set to a pressure for draining such an amount of the puncture repair liquid 4, which is in a range between 50 kPa to 100 kPa, for example, approximately 80 kPa. After the tire 1 is filled with air, the hose 42 of the pressurized air source 40 is detached from the other connecting port 24 of the container 20. The puncture repair liquid 4 in the tire 1 is recovered into the container 20 by utilizing an action caused by the pressure escaping from the tire 1.

According to the aforementioned method for recovering puncture repair liquid into the container 20, the tire valve 3 does not have to be cut out when the puncture repair liquid 4 in the tire 1 is recovered. After the puncture repair liquid 4 is recovered, the tire valve 3 can be used as it is. In addition, since the tube 10 can be made as wide as possible within an allowable range of the tire valve 3, the puncture repair liquid 4 can be recovered in a short time based on the pressure inside the tire 1. Thus, the recovery operation of the puncture repair liquid 4 can be efficiently performed without cutting out the tire valve 3.

In the aforementioned recovery operation of the puncture repair liquid 4, the optional attachment 50 does not have to be necessarily used. However, when used, the attachment 50 is used in the following manner. Specifically, the tire 1 is filled with air, and the hose 42 of the pressurized air source 40 is detached from the connecting port 24 of the container 20. Immediately after this, the attachment 50 is attached to the connecting port 24. Since the attachment 50 has the discharge port 51 smaller than the connecting port 24 of the container 20, the flow rate of discharging gas from the container 20 is reduced based on the size of the discharge port 51. Thus, even when the pressure in the tire 1 is too high, it is possible to prevent the puncture repair liquid 4 from blowing outside. In particular, the use of the attachment 50 having the pool portion 53 enables the pool portion 53 to receive and contain the puncture repair liquid 4 blown from the container 20, thus making it possible to more reliably prevent the puncture repair liquid 4 from blowing outside.

The preferable embodiments of the present invention have been described in detail, but it shall be understood that the preferable embodiments can be variously modified, substituted, and replaced without departing from the spirit or scope of the present invention as defined by the appended scope of claims.

The invention claimed is:

1. A method for recovering puncture repair liquid, comprising:
    detaching a valve core from a tire valve of a wheel with a tire mounted thereon into which puncture repair liquid has been injected;
    inserting a tube into the tire via the tire valve, the tube having at least a length that permits the tube to reach an inner surface of the tire when inserted into the tire from the tire valve mounted to the wheel;
    connecting a connecting hose and a container between the tire valve and a pressurized air source, the container including a pair of connecting ports and being configured to receive and contain puncture repair liquid recovered from inside of the tire, and the connecting hose being configured for connection between the tire valve and one of the connecting ports of the container, with the other connecting port of the container being configured to removably attach to the pressurized air source;
    filling the tire with air from the pressurized air source, and then detaching the pressurized air source from the other connecting port of the container; and
    recovering into the container the puncture repair liquid that exits the tire due to pressure of the air escaping from the tire.

2. The method for recovering puncture repair liquid according to claim 1, wherein
    the tube is narrower than a narrowest portion of a through-hole of the tire valve; and
    a locking portion thicker than the narrowest portion of the through-hole of the tire valve is provided at an end portion of the tube on a tire valve side of the tube;
    the inserting inserts the end portion of the tube into the tire.

3. The method for recovering puncture repair liquid according to claim 1, wherein
    the tube comprises a scale indicating a cutting length; and
    the method further comprises cutting the tube, according to a tire size, based on the scale.

4. The method for recovering puncture repair liquid according to claim 3, wherein the scale is directly indicated on the tube.

5. The method for recovering puncture repair liquid according to claim 1, further comprising
    after the pressurized air source is detached from the other connecting port of the container, attaching an attachment having a discharge port smaller than the other connecting port of the container to the other connecting port of the container to reduce a gas discharge flow rate.

6. The method for recovering puncture repair liquid according to claim 5, further comprising
    receiving and containing the puncture repair liquid blown from the container into a pool portion of the attachment.

7. A device for recovering puncture repair liquid, comprising:
    a tube having at least such a length that permits the tube to reach an inner surface of a tire when inserted into the tire from a tire valve mounted to a wheel;
    a container having a pair of connecting ports and configured to receive and contain puncture repair liquid recovered from inside of the tire;
    a connecting hose configured to connect between the tire valve and one of the connecting ports of the container, the other connecting port of the container being configured to removably attach to a pressurized air source; and
    an attachment configured to attach to the other connecting port of the container, the attachment having a discharge port smaller than the other connecting port of the container and including a pool portion configured to receive and contain the puncture repair liquid blown from the container.

8. The device for recovering puncture repair liquid according to claim 7, wherein
    the tube is narrower than a narrowest portion of a through-hole of the tire valve; and
    a locking portion thicker than the narrowest portion of the through-hole of the tire valve is provided at an end portion of the tube on a tire valve side of the tube.

9. The device for recovering puncture repair liquid according to-claim 7, wherein
    the tube comprises a scale indicating a cutting length.

10. The device for recovering puncture repair liquid according to claim 9, wherein
    the scale is directly indicated on the tube.

11. The method for recovering puncture repair liquid according to claim 2, wherein
    the tube comprises a scale indicating a cutting length; and
    the method further comprises cutting the tube, according to a tire size, based on the scale.

12. The method for recovering puncture repair liquid according to claim 2, further comprising
    after the pressurized air source is detached from the other connecting port of the container, attaching an attachment having a discharge port smaller than the other connecting port of the container to the other connecting port of the container to reduce a gas discharge flow rate.

13. The method for recovering puncture repair liquid according to claim 3, further comprising
    after the pressurized air source is detached from the other connecting port of the container, attaching an attachment having a discharge port smaller than the other connecting port of the container to the other connecting port of the container to reduce a gas discharge flow rate.

14. The method for recovering puncture repair liquid according to claim 4, further comprising
    after the pressurized air source is detached from the other connecting port of the container, attaching an attachment having a discharge port smaller than the other connecting port of the container to the other connecting port of the container to reduce a gas discharge flow rate.

15. The device for recovering puncture repair liquid according to claim 8, wherein
    the tube comprises a scale indicating a cutting length.

* * * * *